(12) United States Patent
Park

(10) Patent No.: US 8,786,783 B2
(45) Date of Patent: Jul. 22, 2014

(54) VIDEO AND GRAPHIC COMBINATION AND DISPLAY APPARATUS AND IMAGE COMBINING AND DISPLAYING METHOD THEREOF

(71) Applicant: Samsung Electronics Co., Ltd., Suwon-si (KR)

(72) Inventor: Jae-hong Park, Seoul (KR)

(73) Assignee: Samsung Electronics Co., Ltd., Suwon Si (KR)

( * ) Notice: Subject to any disclaimer, the term of this patent is extended or adjusted under 35 U.S.C. 154(b) by 0 days.

(21) Appl. No.: 13/716,906

(22) Filed: Dec. 17, 2012

(65) Prior Publication Data

US 2013/0169871 A1    Jul. 4, 2013

(30) Foreign Application Priority Data

Dec. 30, 2011    (KR) .......................... 10-2011-0147158

(51) Int. Cl.
*H04N 9/74*  (2006.01)
*H04N 9/76*  (2006.01)
*H04N 7/00*  (2011.01)

(52) U.S. Cl.
USPC ............................ 348/589; 348/600; 348/552

(58) Field of Classification Search
USPC ......... 348/552, 584, 588, 706, 553, 563, 564, 348/598, 600, 589; 725/132, 133, 140, 141, 725/152, 153; 345/629, 632–634; 715/717, 715/718
See application file for complete search history.

(56) References Cited

U.S. PATENT DOCUMENTS

| | | | | |
|---|---|---|---|---|
| 5,907,715 A * | 5/1999 | Stoel et al. | ...................... | 710/46 |
| 6,519,771 B1 * | 2/2003 | Zenith | .............................. | 725/32 |
| 6,621,499 B1 * | 9/2003 | Callway | ........................ | 345/629 |
| 7,307,667 B1 * | 12/2007 | Yeh et al. | ...................... | 348/555 |
| 7,313,805 B1 * | 12/2007 | Rosin et al. | ...................... | 725/45 |
| 7,425,992 B2 | 9/2008 | Feeler et al. | | |
| 7,548,242 B1 * | 6/2009 | Hughes et al. | ................ | 345/473 |
| 7,631,277 B1 * | 12/2009 | Nie et al. | ...................... | 715/848 |
| 7,840,979 B2 * | 11/2010 | Poling et al. | .................... | 725/41 |
| 8,176,515 B2 * | 5/2012 | Ahmad et al. | ................... | 725/43 |
| 2001/0016947 A1 * | 8/2001 | Nishikawa et al. | ............. | 725/51 |
| 2003/0079224 A1 * | 4/2003 | Komar et al. | ................... | 725/32 |
| 2006/0253874 A1 * | 11/2006 | Stark et al. | ...................... | 725/62 |
| 2008/0084834 A1 * | 4/2008 | Stanek | .......................... | 370/284 |
| 2008/0148335 A1 * | 6/2008 | Dawson et al. | ............... | 725/132 |
| 2009/0177556 A1 * | 7/2009 | Matsuo | .......................... | 705/26 |
| 2009/0180025 A1 | 7/2009 | Dawson | | |
| 2010/0162319 A1 * | 6/2010 | Piepenbrink et al. | ........... | 725/52 |
| 2010/0325667 A1 * | 12/2010 | Lee et al. | ........................ | 725/51 |

* cited by examiner

Primary Examiner — Victor Kostak
(74) Attorney, Agent, or Firm — Sughrue Mion, PLLC

(57) ABSTRACT

A display apparatus includes a display which displays an image; an external peripheral device; a peripheral device interface connected to the external peripheral device; an image composing module which combines a video signal with a graphic signal and outputs a combined signal to the display; and a controller which outputs a graphic signal to the image composing module when the graphic signal is input from the external peripheral device through the peripheral device interface, the graphic signal being associated with contents of a video signal displayed on the display and displayed along with the video signal.

18 Claims, 6 Drawing Sheets

VIDEO AND GRAPHIC COMBINATION AND DISPLAY APPARATUS AND IMAGE COMBINING AND DISPLAYING METHOD THEREOF

CROSS-REFERENCE TO RELATED APPLICATION

This application claims priority from Korean Patent Application No. 10-2011-0147158, filed on Dec. 30, 2011, in the Korean Intellectual Property Office, the disclosure of which is incorporated herein in its entirety by reference.

BACKGROUND

1. Field

The present inventive concept relates to a display apparatus and an external peripheral device connected thereto, and more particularly to a display apparatus connected to an external peripheral device providing a feature that is not supported by the display apparatus.

2. Description of the Related Art

Generally, televisions (TVs) have a function of receiving and playing broadcast signals. With rapid technological advancement, hardware of audio-video (AV) devices, such as TVs, is upgraded at a fast pace, and expansion or addition of new features in software tend to continue. However, once a user purchases an expensive display apparatus, such as a TV, the user may not use upgraded features with the display apparatus until it is replaced by a new device, for example, for 5 to 7 years.

A conventional TV cannot perform functions of playing videos, receiving and executing game images from different image sources, or retrieving and displaying information in real time through a network such as the Internet, which are realized by an up-to-date device, such as a smart television.

SUMMARY

Accordingly, one or more exemplary embodiments provide a display apparatus which is capable of displaying a graphic signal using an external peripheral device, and an image displaying method thereof, wherein the graphic signal is associated with contents of a video signal and displayed along with the video signal.

Further, one or more exemplary embodiments also provide a display apparatus which determines a kind of an image input from an external peripheral device and displays the image, and an image displaying method thereof.

In accordance with an aspect of an exemplary embodiment, there is provided a display apparatus including: a display which displays an image; an external peripheral device; a peripheral device interface connected to the external peripheral device; an image composing module which combines a video signal with a graphic signal and outputs a combined signal to the display; and a controller which outputs a graphic signal to the image composing module when the graphic signal is input from the external peripheral device through the peripheral device interface, the graphic signal being associated with contents of a video signal displayed on the display and displayed along with the video signal.

The display apparatus may further include a video processor which processes a video signal, wherein the controller outputs a video signal to the video processor when the video signal is input through the peripheral device interface.

The display apparatus may further include a user interface which receives a selection by a user, wherein the controller outputs a control signal to the external peripheral device so that the graphic signal provided from the external peripheral device is output to the image composing module when a selection signal to display the desired graphic signal is received through the user interface.

The graphic signal provided from the external peripheral device may include transparency information.

The peripheral device interface may include a USB port and an HDMI port.

The external peripheral device may be connectable to a network and receives data through the network.

In accordance with an aspect of another exemplary embodiment, there is provided a display apparatus including: a display displaying an image; an external peripheral device; a peripheral device interface connected to the external peripheral device; a video processor which processes a video signal; an image composing module which combines the video signal with a graphic signal associated with contents of the video signal and displayed together with the video signal, and outputs a combined signal to the display; and a controller which determines whether an image signal received through the peripheral device interface is the graphic signal, outputs the graphic signal to the image composing module when the image signal is the graphic signal, and outputs the video signal to the video processor when the image signal is the video signal.

In accordance with an aspect of another exemplary embodiment, there is provided an image displaying method of a display apparatus including a peripheral device interface connected to an external peripheral device and a display, the image displaying method includes: receiving a graphic signal associated with contents of a video signal displayed on the display and displayed along with the video signal from the external peripheral device through the peripheral device interface; combining the graphic signal with the video signal; and displaying the video signal and the graphic signal on the display.

The image displaying method may further include receiving a video signal through the peripheral device interface; and processing and displaying the received video signal on the display.

The display apparatus may further include a user interface which receives a selection by a user, and the method may further include receiving a selection signal to display the desired graphic signal through the user interface; outputting a control signal to the external peripheral device so that the graphic signal provided from the external peripheral device is output to an image composing module.

In accordance with an aspect of another exemplary embodiment, there is provided an image displaying method of a display apparatus including a peripheral device interface connected to an external peripheral device and a display, the image displaying method including: receiving an image signal through the peripheral device interface; determining whether the image signal is a graphic signal associated with contents of a video signal displayed on the display and displayed together with the video signal; and combining an input graphic signal with the video signal when the image signal is the graphic signal or processing a video signal when the image signal is the video signal, and displaying the signal on the display.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
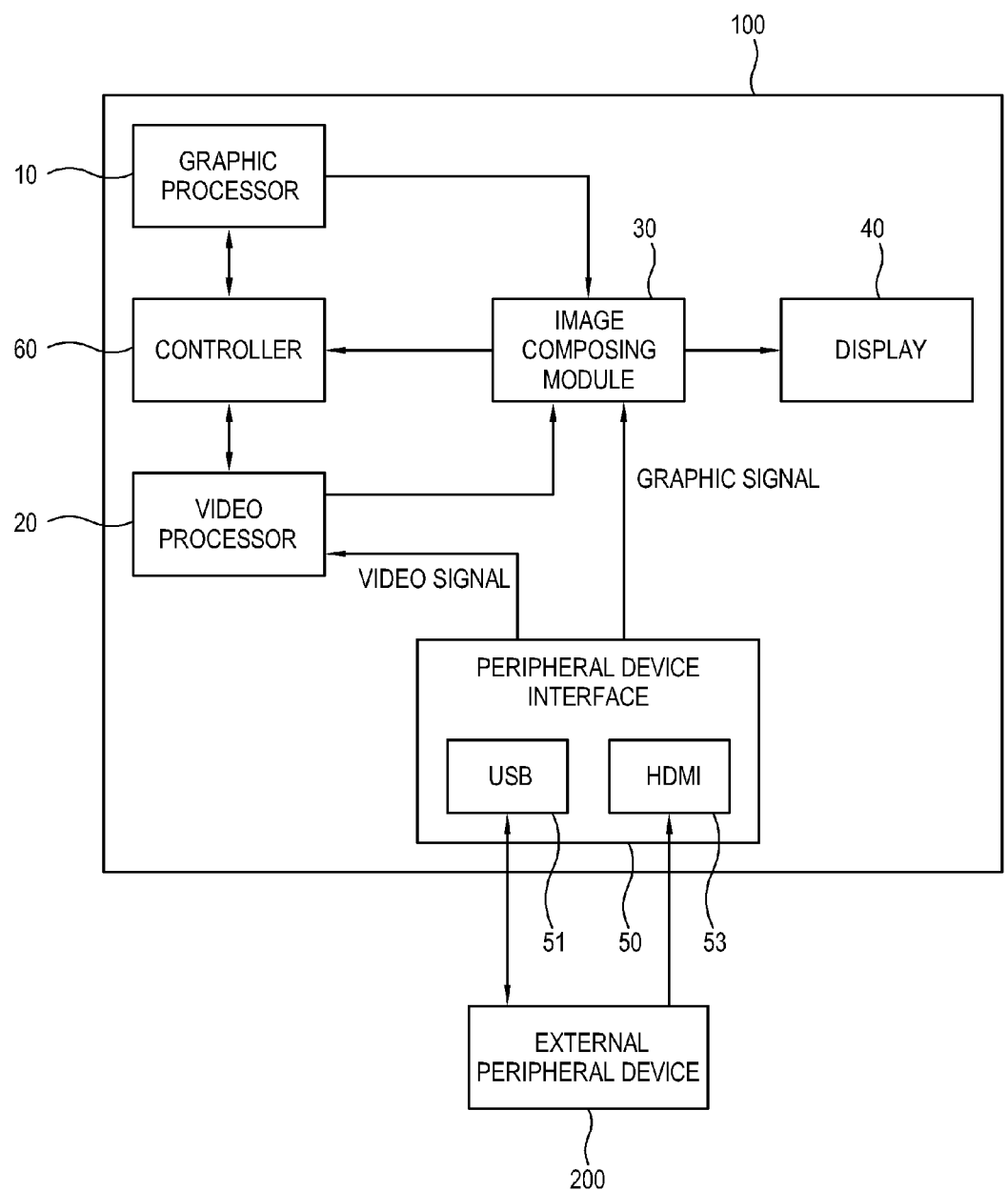
FIG. 1 is a block diagram of a display apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

FIG. 1 is a block diagram of a display apparatus according to an exemplary embodiment.

As shown in FIG. 1, the display apparatus 100 includes a graphic processor 10, a video processor 20, an image composing module 30, a display 40, a peripheral device interface 50, and a controller 60 controlling these components. The display apparatus 100 may be, for example, but not limited to, a computer, mobile equipment, and a digital television, which are capable of receiving and displaying a video signal including a broadcast signal, and an audio-video (AV) apparatus connected to a wire-based or wireless network. A broadcast signal may include digital and analog broadcast signals, a satellite broadcast signal, and a cable broadcast signal. The display apparatus 100 may include a broadcast reception unit (not shown) receiving a broadcast signal or a network interface (not shown) capable of receiving a video signal through a network.

The graphic processor 10 processes a graphic signal superimposed on a video signal, for example, but not limited to, an on-screen display (OSD), a sub-picture, and a subtitle. A graphic signal may include a plurality of layers. The graphic processor 10 may be configured as an OSD generation unit generating a graphic user interface, such as an OSD, or as a central processing unit (CPU) (not shown) responsible for control of the display apparatus 100. When the graphic processor 10 is configured as a CPU, the graphic processor 10 may merge with the controller 60. As will be understood by one of ordinary skill in the art, the functions of the graphics processor 10 and controller 60, as well as other control and processing functions of the display apparatus 100 may be implemented by the CPU. A configuration in which the graphic processor 10 and the controller 60 are provided as independent components shown in FIG. 1 is provided only for convenience of illustration and does not necessarily mean that the two components are physically separate.

The video processor 20 processes a video signal that is a main image, such as a broadcast signal. The video processor 20 may include, for example, but not limited to, a demultiplexer, an MPEG decoder, an image quality adjustment unit, and an image quality enhancement unit. Also, the display apparatus 100 may further include a sound processor (not shown) for sound processing.

The image composing module 30 incorporates hardware and software for combining a video signal and a graphic signal and outputting a composite signal to the display 40. The image composing module 30 also incorporates hardware and software for performing alpha blending, a process of combining images based on transparency information indicating transparency of overlapping images. The transparency information is generally referred to as an alpha value, which is 8-bit data that distinguishes transparency levels from 0 to 255. The image composing module 30 includes known algorithms for combining a video signal and a graphic signal, without the algorithms being particularly limited. The image composing module 30 combines a broadcast signal as a lower layer with a graphic signal, for example, but not limited to, channel information indicating a channel number and a program title, a subtitle and a teletext, as a higher layer. The image composing module 30 may be configured as a scaler or a processing module that adjusts quality of an image and outputs the image finally to the display 40.

The display 40 displays a main image, such as a broadcast signal, and a graphic image combined with the main image. The display 40 may include a panel, such as a liquid crystal display (LCD) panel including liquid crystals, an organic light emitting diode (OLED) panel including OLEDs, a plasma display panel (PDP), a flexible display and a three-dimensional (3D) display, and a panel driver driving the panel.

The peripheral device interface 50 corresponds to an interface connected to an external peripheral device 200. As shown in FIG. 1, the peripheral device interface 50 includes a USB port 51 and an HDMI port 53. The peripheral device interface 50 may be connected to an external peripheral device 200 in order to support a feature which is not supported by the existing display apparatus 100. A USB signal including a control signal may be transmitted and received through the USB port 51, and a digital signal may be received from the external peripheral device 200 through the HDMI port 53. Signals transmitted and received through the USB port 51 and the HDMI port 53 comply with defined standards, which are not described in detail herein.

The external peripheral device 200 provides a variety of image signals to the display apparatus 100 so as to provide a feature which is not executed by the display apparatus 100. For example, the external peripheral device 200 may provide a game image and a film image to the display apparatus so that a game image or video such as a movie, other than a broadcast signal, is displayed on the display apparatus 100. Further, the external peripheral device 200 may provide a data service associated with a broadcast signal currently being received and displayed. For example, when the display apparatus 100 is displaying a broadcast signal, the external peripheral device 200 may provide a search feature associated with the broadcast signal being displayed, an advertisement associated with a broadcast or information about the broadcast, a real-time data signal such as a survey, or information about stocks. Such information, transmitted to the external peripheral device 200 through a web network such as the Internet, is data which is not input to the conventional display apparatus 100. In short, the external peripheral device 200 may provide various features provided by a smart television to the display apparatus 100 beyond an image source, such as a current DVD.

An image signal provided by the external peripheral device 200 to the display apparatus 100 through the HDMI port 53 may include a graphic signal which is associated with a video signal that is a main image displayed on the entire display, such as a broadcast signal, i.e., contents of a video signal, being superimposed on the main image, and displayed along with the video signal. A video or game image is a video signal, and various data associated with a broadcast signal, data such as information about stocks, and OSD information are graphic information.

The external peripheral device 200 is a device which is connected to the display apparatus 100, which is not capable of performing a newly developed or updated feature, and provides various images thereto, thereby enabling the display apparatus 100 to have various features. Due to the external peripheral device 200, a user may readily utilize a new feature without purchasing an updated display apparatus 100.

When a graphic signal to be displayed together with a video signal displayed on the display 40 is input through the peripheral device interface 50, the controller 60 outputs the input graphic signal to the image composing module 30.

An image signal input from a conventional external source, such as a DVD, is input to the video processor of the display apparatus and processed. When input images are input from two sources, the graphic signal needs to be processed for the superimposing.

According to the exemplary embodiment, when a signal provided from the external peripheral device 200 is a video signal, the video signal is processed by the video processor 20 and displayed on the display 40. When a signal provided from the external peripheral device 200 is a graphic signal, the signal is input to the image composing module 30. The image composing module 30 combines the graphic signal input through the peripheral device interface 50 with a video signal and outputs the combined signal to the display 40. Then, a user can view various data associated with a broadcast signal being superimposed on the broadcast signal. The graphic signal input from the external peripheral device 200 may include an alpha value for alpha blending. An HDMI interface, from a 1.3 HDMI version, supports 24-bit or higher (30 to 48 bit) deep color. Thus, when 8-bit red, green, and blue (RGB) are input, the alpha value may be received through the remaining bits. An interface for data communication of the graphic signal may be standardized between the display apparatus 100 and the external peripheral device 200.

Figure 2:
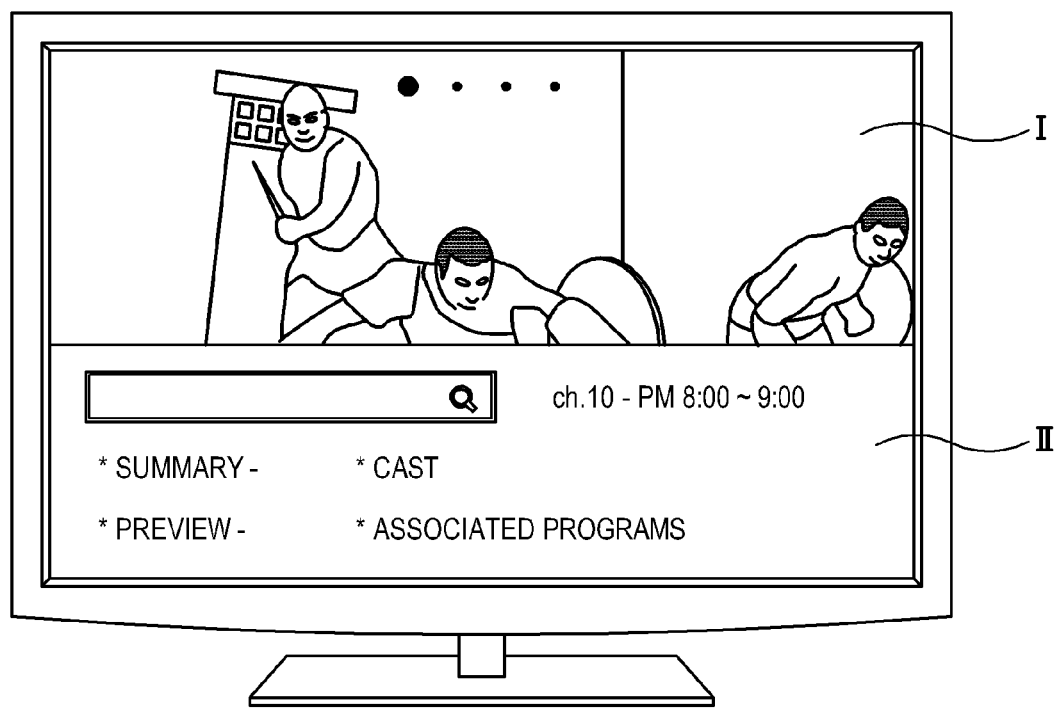
FIG. 2 illustrates a composite signal displayed on the display apparatus of FIG. 1.

FIG. 2 illustrates a composite signal displayed on the display 40. As shown in FIG. 2, a video signal I and a graphic signal II are displayed on the display 40. A broadcast signal that is a main image is displayed as the video signal I, and a search window for user's input and data associated with the broadcast signal (summary, cast, preview, associated programs, and channel information) are displayed as the graphic signal II. The graphic signal II is a signal received from the external peripheral device 200, which is not provided autonomously by the display apparatus 100. In the exemplary embodiment, the graphic signal II may be received from the external peripheral device 200 and displayed on the display 40. A user may use a feature not supported by the display apparatus 100 through the composite image signal by the image composing module 30.

Figure 3:
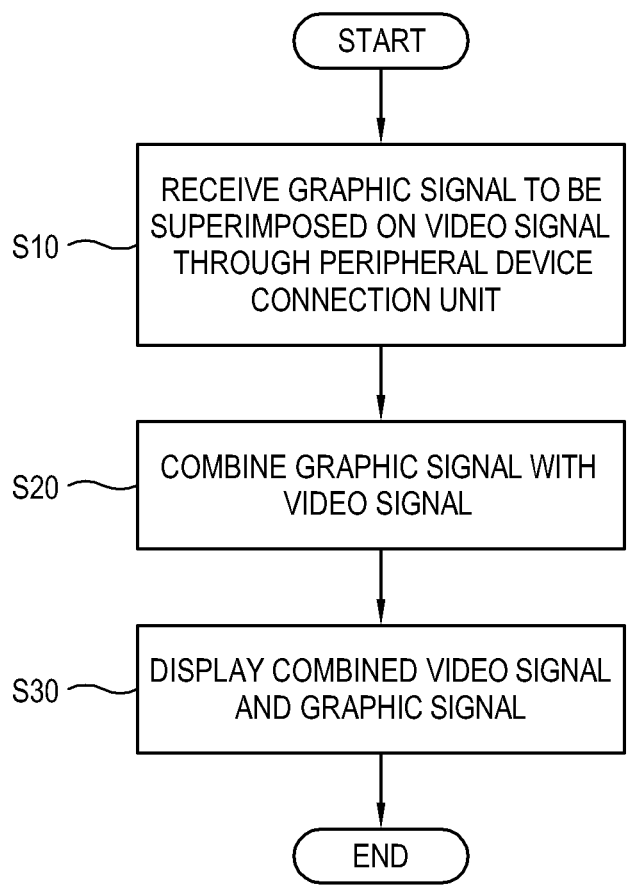
FIG. 3 is a flowchart illustrating an image displaying method of the display apparatus of FIG. 1 according to an exemplary embodiment.

FIG. 3 is a flowchart illustrating an image displaying method of the display apparatus 1. The image displaying method of the display apparatus according to the exemplary embodiment is summarized as follows with reference to FIG. 3.

The display apparatus 100 receives a graphic signal associated with contents of a video signal and displayed along with the video signal through the peripheral device interface 50 (S 10). The graphic signal input through the HDMI port 53 of the peripheral device interface 50 includes an alpha value for alpha blending in addition to RGB.

The image composing module 30 combines the input graphic signal with the currently received video signal (S20). The combined signal is displayed on the display (S30).

Further, the image composing module 30 combines not only the graphic signal input through the peripheral device interface 50 but also a graphic signal autonomously provided by the display apparatus 100 with the video signal. For example, the image composing module 30 may combine channel information, a subtitle and a teletext which are provided independently by the display apparatus 100, not by the external peripheral device 200, with the video signal, and display the combined signal together with the graphic signal received from the external peripheral device 200.

The video signal may be subjected to various procedures of image quality processing before or after being processed by the video processor 20. If the graphic signal needs image quality processing, such a procedure may be conducted by the external peripheral device 200 or performed while the graphic signal is combined by the image composing module 30. Alternatively, after the graphic signal and the video signal are combined, the composite signal may be subjected to a separate process for improving image quality.

Figure 4:
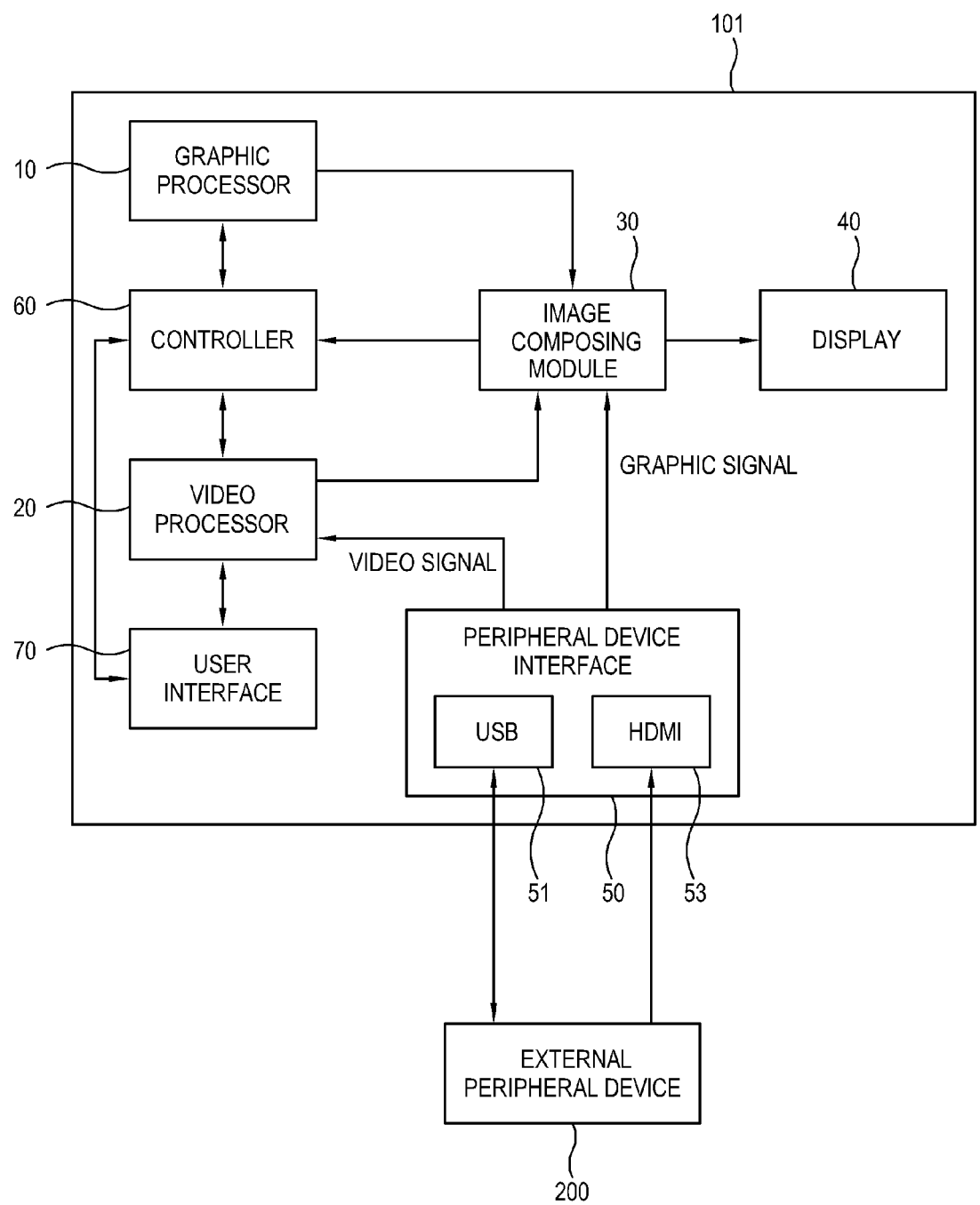
FIG. 4 is a block diagram of a display apparatus according to another exemplary embodiment.

FIG. 4 is a block diagram of a display apparatus according to another exemplary embodiment.

The display apparatus 101 according to the exemplary embodiment includes a user interface 70 to receive a user's selection. The user interface 70 includes a user input unit, for example, but not limited to, a remote controller, a key pad, a touch pad, a button and a mouse, and a graphic interface interacting with the user input unit. When desiring to view an Internet-based graphic signal while watching a broadcast signal, a user may request data through the user interface. When the selection by the user is received as a selection signal from the user interface, a controller 60 outputs a control signal to an external peripheral device 200 so that a graphic signal provided from the external peripheral device 200 is output to an image composing module 30.

The external peripheral device 200 receiving the control signal outputs a graphic signal desired by the user to the image composing module 30 instead of to a video processor 20. That is, the external peripheral device 200 outputs an image signal on a different route depending on a kind of the image signal input through communication with the display apparatus 101. In short, when the user desires a service from the display apparatus 101, the controller 60 requests the service to the external peripheral device 200 and an output route of the image signal is determined based on the control signal of the controller 60. When the image signal provided by the external peripheral device 200 is a video signal, such as a video or game image, the image signal is output to the video processor 20. If the image signal is a graphic signal received through the Internet, the image signal is output to the image composing module 30.

Figure 5:
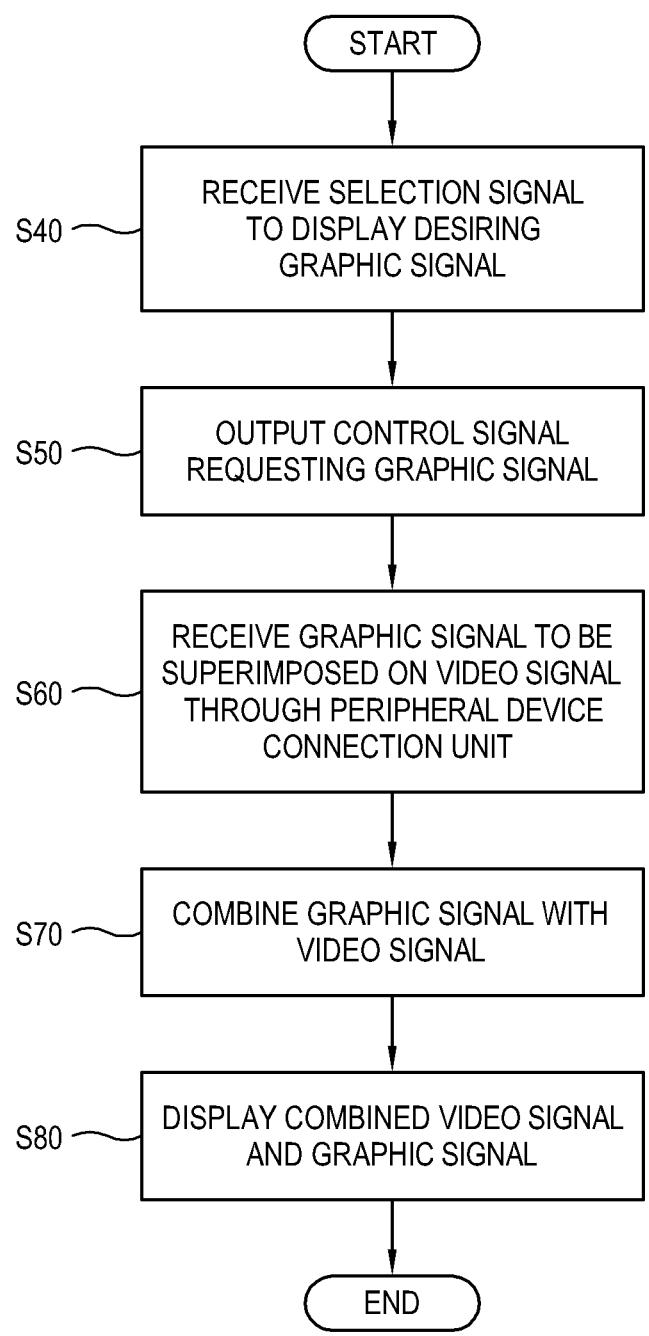
FIG. 5 is a flowchart illustrating an image displaying method of the display apparatus of FIG. 4 according to an exemplary embodiment.

FIG. 5 is a flowchart illustrating an image displaying method of the display apparatus of FIG. 4.

A user may select to receive a graphic signal II using a user interface 70, and the controller 60 receives a selection signal which to display the desired graphic signal (S40).

The controller 60 outputs a control signal requesting the graphic signal to the external peripheral device 200 through a USB port 51 of a peripheral device interface 50 (S50).

The controller 60 receives the graphic signal to be superimposed on a video signal through an HDMI port 53 of the peripheral device interface 50 (S60).

The image composing module 30 combines the input graphic signal and the currently received video signal (S70), and a display 40 displays the combined signal thereon (S80) in the same manner as in the foregoing embodiment.

Figure 6:
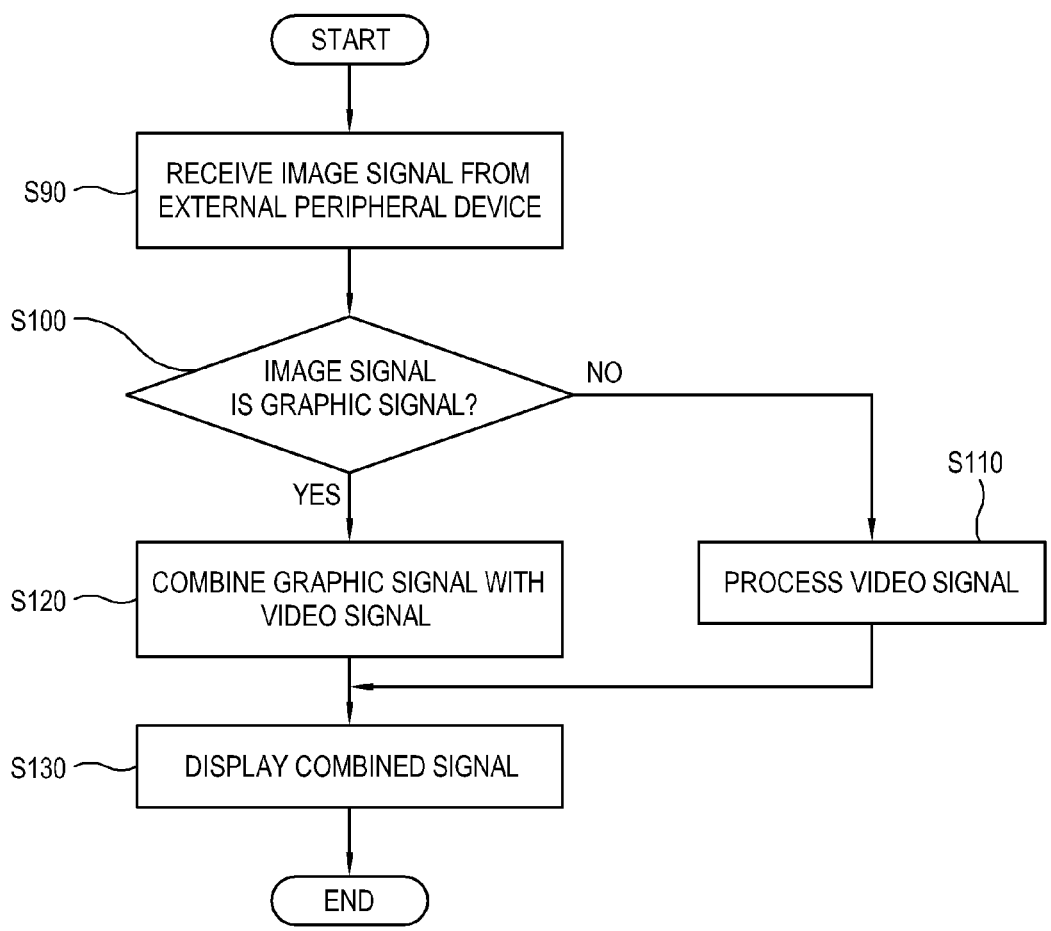
FIG. 6 is a flowchart illustrating an image displaying method of a display apparatus according to still another exemplary embodiment.

FIG. 6 is a flowchart illustrating an image displaying method of a display apparatus according to still another exemplary embodiment.

According to the exemplary embodiment of FIG. 6, a controller 60 may determine whether an image signal received through a peripheral device interface 50 is a graphic signal.

As shown in FIG. 6, the controller 60 receives an image signal from an external peripheral device 200 (S90). When the display apparatus 100 receives and displays a broadcast signal, various graphic signals may be automatically received from the external peripheral device 200. In this case, even if a user does not receive a graphic signal, an image signal may be output from the external peripheral device 200. Also, it may be set up in advance to automatically play an image signal output from the external peripheral device 200.

The controller 60 determines whether the image signal input from an HDMI port 53 is a graphic signal (S100).

If the image signal is a graphic signal, the input graphic signal is output to an image composing module 30, and the image composing module 30 combines the graphic signal with a video signal (S120).

However, if the image signal is a video signal, the input video signal is output to a video processor 20 to be processed (S110).

The image signal processed by the image composing module 30 or the video processor 20 is displayed on the display (S130).

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
a display configured to display an image;
a peripheral device interface configured to connect to an external peripheral device;
an image composing module configured to combine a video signal with a graphic signal and output a combined signal to the display;
a video processor configured to process a video signal; and
a controller configured to directly output the graphic signal input from the external peripheral device to the image composing module in response to the graphic signal being input from the external peripheral device through the peripheral device interface, and to output the video signal input from the external peripheral device to the video processor in response to the video signal being input from the external peripheral device through the peripheral device interface.

2. The display apparatus of claim 1, further comprising a user interface configured to receive a selection by a user, wherein the controller is further configured to output a control signal to the external peripheral device so that the graphic signal provided from the external peripheral device is output to the image composing module in response to a selection signal to display the desired graphic signal being received through the user interface.

3. The display apparatus of claim 1, wherein the graphic signal provided from the external peripheral device comprises transparency information.

4. The display apparatus of claim 1, wherein the peripheral device interface comprises a USB port and an HDMI port.

5. The display apparatus of claim 1, wherein the external peripheral device is connectable to a network and receives data through the network.

6. The display apparatus of claim 1, wherein the peripheral device interface is further configured to receive the video signal and the graphic signal as separate signals.

7. The display apparatus of claim 1, wherein the peripheral device interface is further configured to receive the video signal and the graphic signal in different signal forms.

8. A display apparatus comprising:
a display configured to display an image;
a peripheral device interface configured to connect to an external peripheral device, wherein the external peripheral device is configured to output a video signal and a graphic signal to the peripheral device interface;
a video processor configured to process a video signal;
an image composing module configured to combine the video signal with a graphic signal associated with contents of the video signal and displayed together with the video signal, and output a combined signal to the display; and
a controller configured to determine whether an image signal received through the peripheral device interface is the graphic signal, directly output the graphic signal to the image composing module in response to the image signal being the graphic signal, and output the video signal to the video processor in response to the image signal being the video signal.

9. An image displaying method of a display apparatus comprising a peripheral device interface connected to an external peripheral device and a display, the image displaying method comprising:
receiving a graphic signal and/or a video signal from the peripheral device through the peripheral device interface;
directly outputting the graphic signal received from the peripheral device to the image composing module in response to the graphic signal being input from the external peripheral device through the peripheral device interface and outputting the video signal received from the peripheral device to the video processor in response to the video signal being input from the external peripheral device through the peripheral device interface;
combining the graphic signal with the video signal; and
displaying the video signal and the graphic signal on the display.

10. The image displaying method of claim 9, wherein the display apparatus further comprises a user interface which receives a selection by a user, and
the method further comprises:
receiving a selection signal to display the desired graphic signal through the user interface; and
outputting a control signal to the external peripheral device so that the graphic signal provided from the external peripheral device is output to an image composing module.

11. The image displaying method of claim 9, wherein the graphic signal is a separate signal from the video signal.

12. The image displaying method of claim 9, wherein the graphic signal is in a signal form different from the video signal.

13. An image displaying method of a display apparatus comprising a peripheral device interface connected to an external peripheral device and a display, the image displaying method comprising:

receiving an image signal through the peripheral device interface from the peripheral device;

determining whether the image signal is a graphic signal or a video signal received from the peripheral device through the peripheral device interface;

directly outputting the graphic signal to the image composing module in response to the image signal being the graphic signal, and outputting the video signal to the video processor in response to the image signal being the video signal; and combining an input graphic signal with the video signal in response to the image signal being the graphic signal or processing a video signal in response to the image signal is the video signal, and displaying the signal on the display.

14. An image display system, comprising:

an external peripheral device configured to output a desired signal and a video signal;

a peripheral device interface configured to receive the desired signal and the video signal output by the external peripheral device;

a video processor configured to process the video signal;

an image composing module configured to combine the video signal with the desired signal and output a combined signal;

a display configured to display the combined signal;

a user interface configured to input a user selection signal for selecting the desired signal; and a controller configured to directly output the graphic signal input from the external peripheral device to the image composing module in response to the graphic signal being input from the external peripheral device through the peripheral device interface, and to output the video signal input from the external peripheral device to the video processor in response to the video signal being input from the external peripheral device through the peripheral device interface.

15. The image display system of claim 14, wherein in response to a selection signal from the user interface being received, the controller is further configured to output a control signal to the external peripheral device so that the external peripheral device outputs the desired signal.

16. The image display system of claim 15, wherein the graphic signal comprises a graphic signal received through the Internet.

17. The image display system of claim 14, wherein the external peripheral device is further configured to output the graphic signal and the video signal as separate signals.

18. The image display system of claim 14, wherein the external peripheral device is further configured to output the graphic signal and the video signal in different signal forms.

* * * * *